US010113485B2

(12) United States Patent
Burghardt et al.

(10) Patent No.: US 10,113,485 B2
(45) Date of Patent: Oct. 30, 2018

(54) DEVICE FOR THE EXTRACTION OF BLEED AIR AND AIRCRAFT ENGINE WITH AT LEAST ONE DEVICE FOR THE EXTRACTION OF BLEED AIR

(71) Applicant: Rolls-Royce Deutschland Ltd & Co KG, Blankenfelde-Mahlow (DE)

(72) Inventors: Sascha Burghardt, Vogelsdorf (DE); Volker Guemmer, Mahlow (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 440 days.

(21) Appl. No.: 14/845,872

(22) Filed: Sep. 4, 2015

(65) Prior Publication Data

US 2016/0069273 A1    Mar. 10, 2016

(30) Foreign Application Priority Data

Sep. 5, 2014   (DE) .................. 10 2014 217 829

(51) Int. Cl.
| | |
|---|---|
| *F02C 9/18* | (2006.01) |
| *F01D 17/14* | (2006.01) |
| *F01D 17/16* | (2006.01) |
| *F02K 3/075* | (2006.01) |
| *F02C 6/08* | (2006.01) |

(52) U.S. Cl.
CPC .............. *F02C 9/18* (2013.01); *F01D 17/141* (2013.01); *F01D 17/16* (2013.01); *F02C 6/08* (2013.01); *F02K 3/075* (2013.01); *F05D 2220/323* (2013.01); *F05D 2250/90* (2013.01)

(58) Field of Classification Search
CPC .. F02C 9/18; F02C 9/52; F01D 17/141; F01D 17/16
See application file for complete search history.

(56) References Cited

U.S. PATENT DOCUMENTS

| | | | |
|---|---|---|---|
| 4,121,606 | A | 10/1978 | Holland et al. |
| 4,250,703 | A | 2/1981 | Norris et al. |
| 4,836,473 | A | 6/1989 | Aulehla et al. |
| 5,279,109 | A | 1/1994 | Liu et al. |
| 6,349,899 | B1 | 2/2002 | Ralston |
| 7,861,968 | B2 | 1/2011 | Parikh et al. |

(Continued)

FOREIGN PATENT DOCUMENTS

| | | |
|---|---|---|
| DE | 854894 | 11/1952 |
| DE | 3015651 A1 | 10/1981 |

(Continued)

OTHER PUBLICATIONS

European Search Report dated Jan. 22, 2016 for counterpart European Application No. 15183752.3.

(Continued)

*Primary Examiner* — Arun Goyal
(74) *Attorney, Agent, or Firm* — Shuttleworth & Ingersoll, PLC; Timothy J. Klima

(57) ABSTRACT

A device for the extraction of bleed air from flowing air at or in an aircraft engine is provided. The device includes a means for specific adjustment of an inlet cross section of an opening at or in the area of a wall of the aircraft engine and a flow guide means for a boundary layer flow.

9 Claims, 4 Drawing Sheets

(56) References Cited

U.S. PATENT DOCUMENTS

| | | | |
|---|---|---|---|
| 8,439,061 B2 * | 5/2013 | Baumann | B64D 13/02 137/15.1 |
| 9,045,998 B2 | 6/2015 | Lo et al. | |
| 2006/0288688 A1 | 12/2006 | Lair | |
| 2010/0132367 A1 | 6/2010 | Brogren | |
| 2014/0053532 A1 | 2/2014 | Zysman | |

FOREIGN PATENT DOCUMENTS

| | | |
|---|---|---|
| DE | 3015651 C2 | 3/1983 |
| EP | 2604837 | 6/2013 |
| GB | 2259328 | 3/1993 |
| WO | WO2008147260 A1 | 12/2008 |

OTHER PUBLICATIONS

German Search Report dated Aug. 14, 2015 for counterpart German patent Application No. DE 10 2014 217 829.0.
European Office Action dated May 24, 2018 from counterpart European App No. 15183752.3.

\* cited by examiner

DEVICE FOR THE EXTRACTION OF BLEED AIR AND AIRCRAFT ENGINE WITH AT LEAST ONE DEVICE FOR THE EXTRACTION OF BLEED AIR

This application claims priority to German Patent Application DE102014217829.0 filed Sep. 5, 2014, the entirety of which is incorporated by reference herein.

BACKGROUND

The invention relates to a device for the extraction of bleed air and to an aircraft engine.

During operation of an aircraft engine, it may be necessary that a certain amount of air is diverted from the flowing air, so that it may serve as cooling air or as air for air conditioning of a passenger cabin, for example. In the following, the diverted air will be referred to as bleed air.

The flowing air from which the bleed air is extracted can flow through a bypass duct or around the aircraft engine, for example.

Known devices for the extraction of bleed air permanently protrude into the air flow and, because of their rigid intake opening, constitute a flow resistance, even if no bleed air is required from the aircraft engine.

SUMMARY

Therefore, there exists the objective to design the extraction of bleed air in a way that is efficient from the flow-engineering perspective.

An adjustable air inlet for the specific adjustment of an inlet cross section of an opening located in or at a wall of the aircraft engine makes it possible to extract bleed air in a variable manner, in particular a manner that may be adjusted based on the given requirements. The extraction of bleed air can be controlled based on how the inlet cross section is oriented in relation to the flowing air.

In order to avoid flow resistance, the adjustable air inlet is coupled to a flow guide means for the purpose guiding, in particular for a separation of a boundary layer flow. Here, the means for guiding the boundary layer flow can be arranged at the transition area of the adjustable air inlet to the wall.

In order to divert the bleed in an efficient manner, one embodiment has an adjustable air inlet with a bent section that protrudes into the flowing air, wherein the inlet cross section is arranged at that end of the bent section that is facing towards the inward flow.

At that, in a first position, the inlet cross section can be closed or orientated in such a manner that no bleed air or substantially no bleed air passes through an opening in the wall.

Here, in one embodiment, a first element and a second element can be provided, which are configured so as to be moveable with respect to one another, so that the elements form the inlet cross section in the first position, and the elements seal or substantially seal the inlet cross section in the second position. A simple design is arrived at when the first element is configured so as to be moveable and so as to have a substantially groove-shaped cross section, wherein the second element is arranged in the groove-shaped cross section with a substantially rigid plate, so that the inlet cross section is formed, where necessary in a moveable manner, between the first element and the second element. The combination of a groove-shaped element and a plate-shaped part arranged therein facilitates a stable design of the adjustable air inlet.

In another embodiment, the adjusting means comprises an electric, hydraulic and / or pneumatic actuator for adjusting the inlet cross section. These can transfer relatively strong forces in a space-saving manner.

In one embodiment, the flow guide means has a rounded, substantially wedge-shaped nose that is directed into the boundary layer flow. Here, it can be particularly expedient if the nose of the flow guide means is not arranged in the immediate area of the inlet cross section, in particular if there is a distance of the nose to the edge of the inlet cross section of at least 10% of the circumference of the inlet cross section, in particular of at least 25% of the circumference of the inlet cross section.

The objective is also solved by an aircraft engine with the features as described herein.

BRIEF DESCRIPTION OF THE DRAWINGS

Exemplary embodiments of the invention are shown in the following figures.

DETAILED DESCRIPTION

Figure 1:
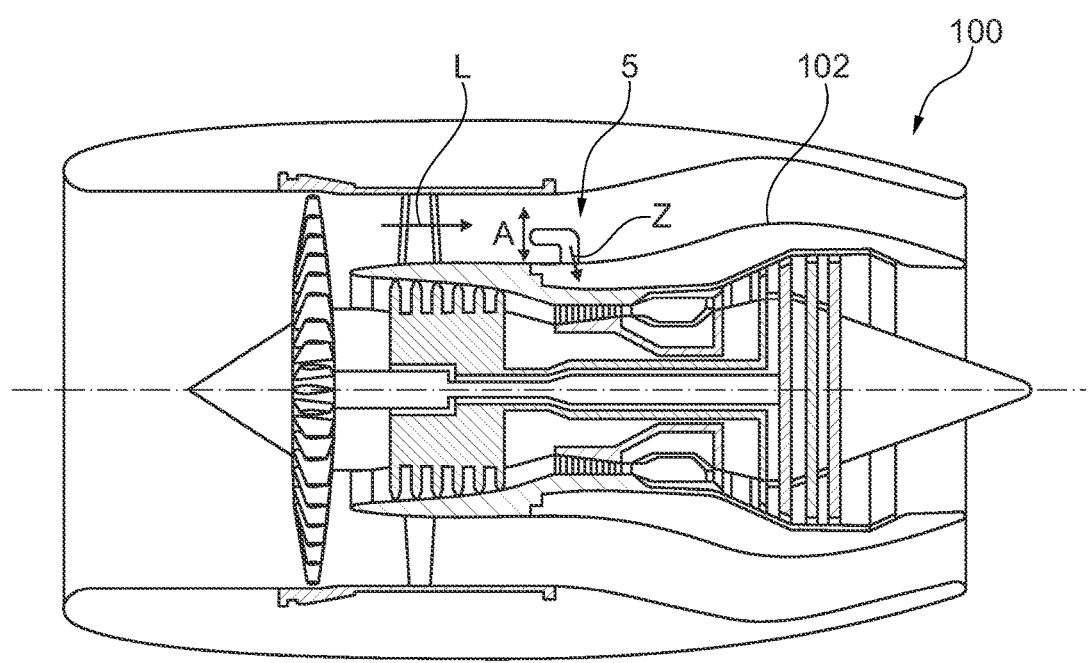
FIG. 1 shows a sectional view of an aircraft engine comprising an embodiment of a device for the extraction of bleed air.

In FIG. 1, a schematic sectional view through an aircraft engine 100 that includes a per se known device 5 for the extraction of bleed air Z is shown. Here, the device 5 protrudes into the flowing air L in the bypass duct 101 rigidly and permanently, so that the bleed air Z is extracted from the flowing air L. Here, the inlet cross section A of the opening 1 for the flowing air is constant and cannot be modified during operation.

After having been diverted from the flowing air L, the bleed air Z is guided, e.g. for cooling purposes, into the interior of the aircraft engine 100, or it is used for air conditioning the passenger cabin.

In alternative embodiments, the bleed air Z can be diverted from another air flow, e.g. from the open air flow around the aircraft engine 100, and used for other purposes, like the air conditioning of the cabin of an aircraft, for example.

In the following, embodiments of the device 5 for the extraction of bleed air Z are shown, in which a specific adjustment of an inlet cross section A of an opening 1 for bleed air Z is facilitated by means of an adjustment mechanism 11, which can include an electric actuator, a hydraulic actuator and/or a pneumatic actuator.

Figure 2A:
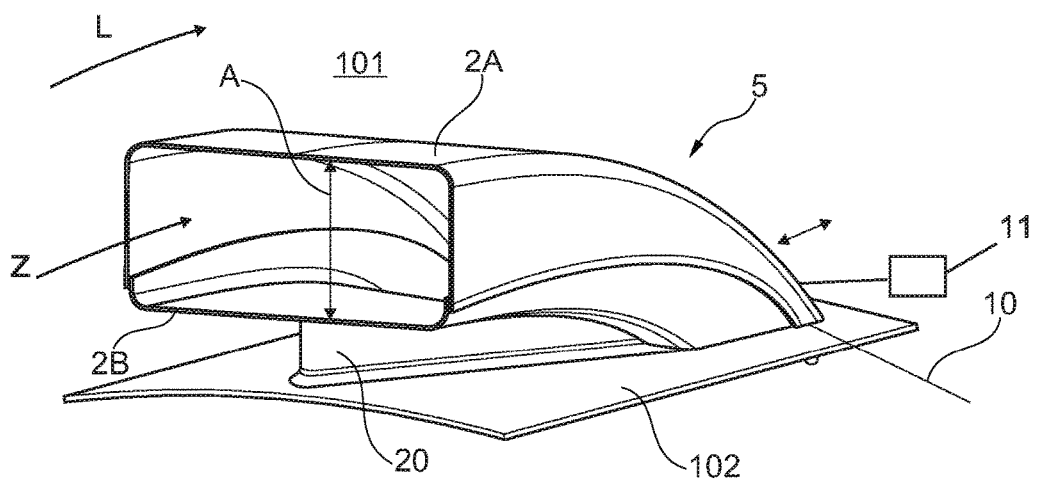
FIG. 2A shows a perspective view of an embodiment of a device for the extraction of bleed air in a first position.
Figure 2B:
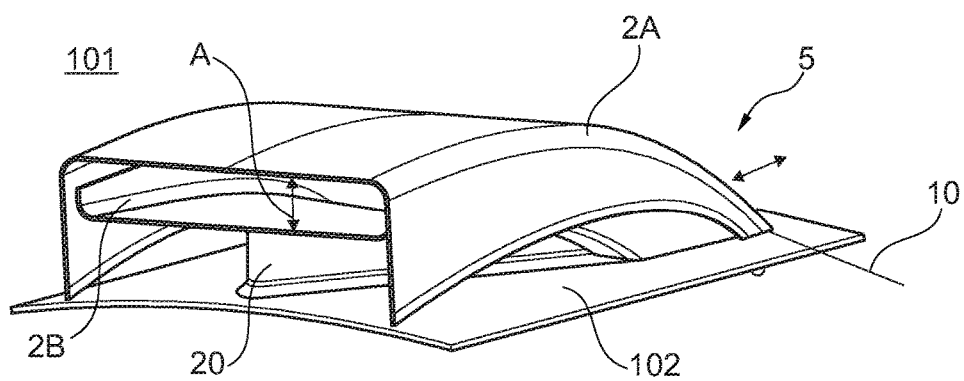
FIG. 2B shows a perspective view of an embodiment of a device of FIG. 2A in a second position.

In FIGS. 2A and 2B, an embodiment of a device 5 for the extraction of bleed air Z is shown in different positions. Here, the device 5 for the extraction of bleed air Z has an inlet cross section A. The inlet cross section A is connected to the opening 1 (see FIG. 2C) via a bent channel.

In this embodiment, the inlet cross section A is positioned substantially perpendicular to the flowing air L (see FIG. 1). Here, the device 5 for the extraction of bleed air Z has a first element 2A, which is arranged above a second element 2B, wherein the first element 2A is configured so as to be moveable with respect to the second element 2B.

Here, the first element 2A is formed in a substantially groove-shaped manner in the shape of a half-shell, wherein the opening of the groove or half-shell is facing downwards. The second element 2B is formed as a kind of rigid plate or a half-shell here that is opened upwards and that limits the groove of the first element 2A towards the bottom.

The first element 2A can be pivoted around an axis 10 (indicated by a double arrow in FIG. 2A), so that the distance between the elements 2A, 2B is changed. When the first element 2A is pivoted downwards (e.g. in a stepless manner) the distance decreases, so that the inlet cross section A becomes smaller (see FIG. 2B). Through upward pivoting, the inlet cross section A is enlarged accordingly (see FIG. 2A).

In this manner, bleed air Z can be diverted from the flowing air L in a controlled manner. Subsequently, it is guided through an opening 1 for bleed air (see FIG. 2C) into the internal space of the housing of the core engine, e.g. to cool certain areas of a turbine wall.

Hereby, a substantially complete sealing can be achieved if the elements 2A, 2B are embodied in a geometrically suitable manner, with the inlet cross section A approaching zero.

In the shown embodiment, the inlet cross section A is substantially rectangular. In alternative embodiments, the inlet cross section A can also have other shapes, e.g. if the top side of the first element 2A is configured in a bent manner, with the second element 2B being adjusted accordingly.

It is also not obligatory that the top first element 2A is configured so as to be moveable with respect to a rigid bottom second element 2B. In alternative embodiments this can also be different, i.e. the second element 2B can be moveable and the first element 2A can be configured so as to be rigid. The two elements 2A, 2B can also be configured so as to be moveable with respect to one other.

Below the inlet cross section A, a flow guide element 20 is arranged by which it is ensured that boundary layer flows are selectively separated and diverted into the bypass duct 101; this occurs independently of the size of the inlet cross section A.

Figure 3A:
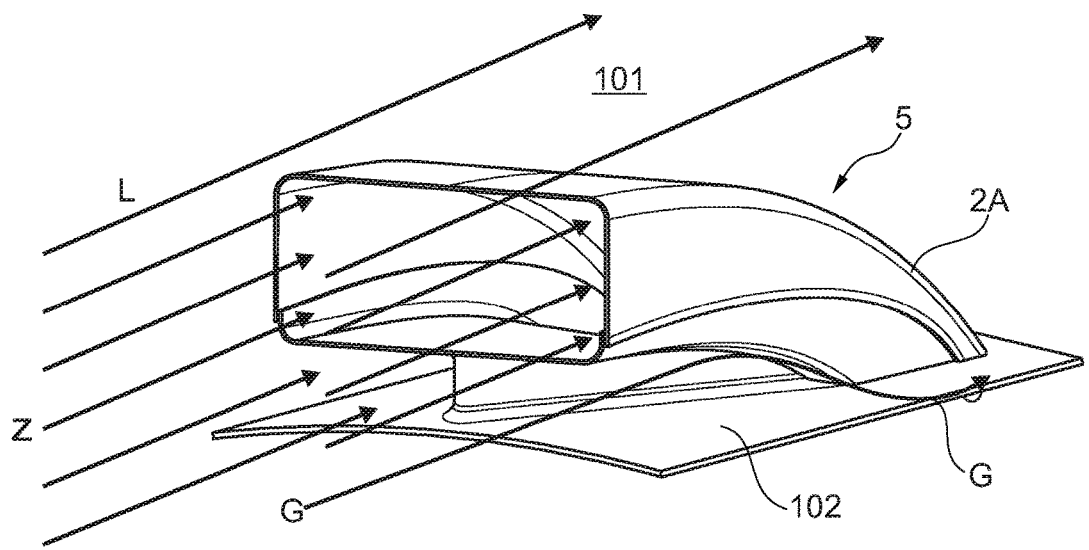
FIG. 3A shows a perspective view of an embodiment of a device for the extraction of bleed air in a first position with a symbolic illustration of the flow.
Figure 3B:
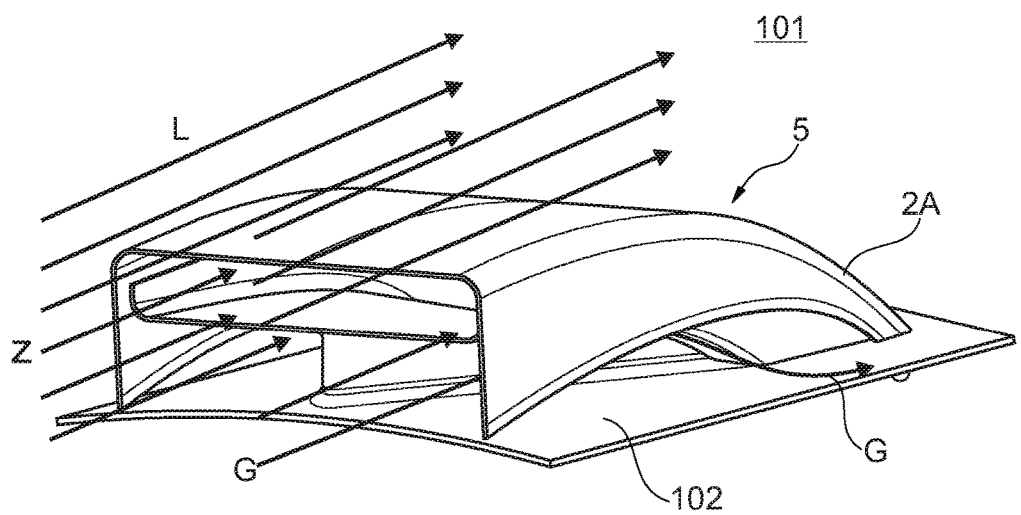
FIG. 3B shows a perspective view of an embodiment of a device for the extraction of bleed air in a second position with a symbolic illustration of the flow.

FIGS. 3A, 3B show the same embodiment as FIGS. 2A, 2B, so that the aforementioned description can be referred to.

In addition, in FIGS. 3A, 3B the different portions of the flow are represented by arrows.

Figure 2C:
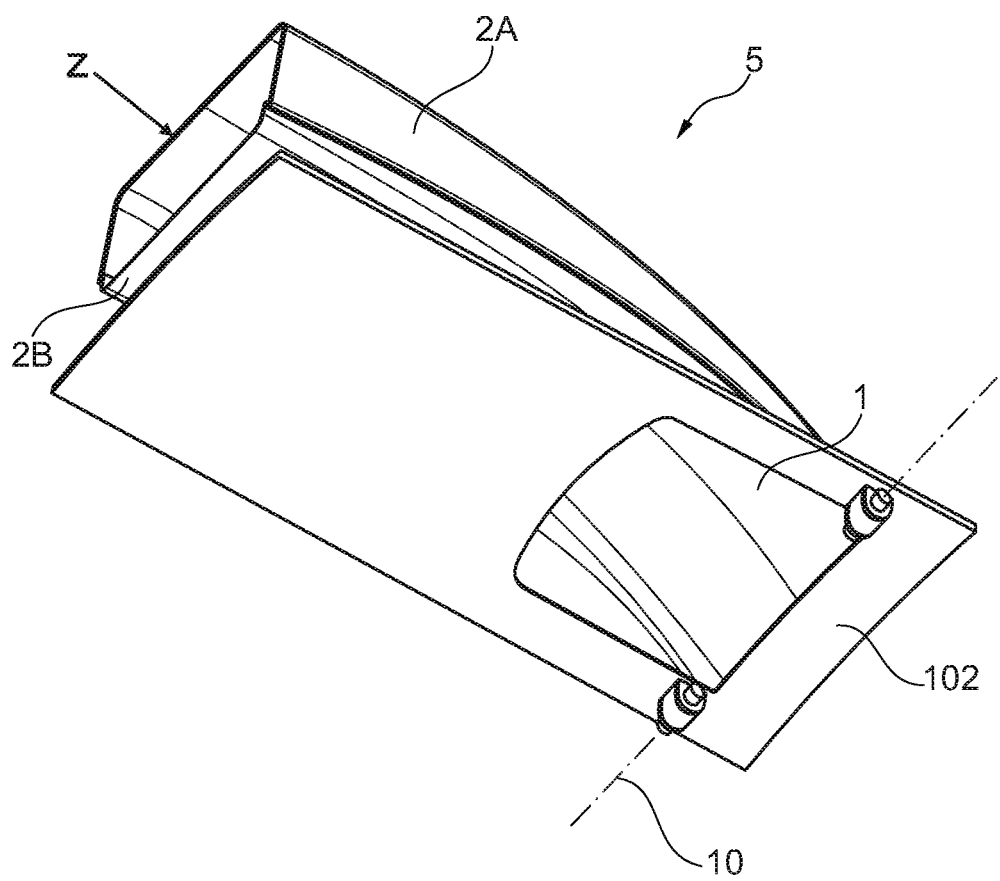
FIG. 2C shows a perspective view of the embodiment of FIGS. 2A and 2B from below.

The flowing air L overflows the device 5 for the extraction of bleed air Z, wherein the bleed air Z is received through the device 5 and is guided to the opening 1 (see FIG. 2C). A boundary layer flow G is selectively guided around the device 5. For this purpose, the connection area between the elements 2A, 2B and the wall 102 is configured as a flow guide means 20. In a top view, the flow guide means 20 has a substantially triangular cross section, wherein the tip (in particular a nose) of the triangle is pointing into the flow in a rounded manner.

It is advantageous here if the flow L that is approaching the air inlet can moisten and flow around the exterior surfaces of the conduit that surrounds the inlet cross section A of the air inlet along its entire circumference. This facilitates that a boundary layer, which is present in the area of the air inlet on the wall, is separated from the air flow received into the air inlet. This is advantageous with view to a maximization of the total pressure level that can be achieved in the air intake. Further it is advantageous when, in the transition area to the wall, the air inlet is designed in such a manner that the boundary layer which is approaching the base of the intake is submitted to as little congestion as possible, which may be achieved through a narrow shape of the profile of the air inlet base around which the boundary layer streams. A rounded and yet substantially wedge-shaped nose of the said profile is advantageous here. It is advantageous when the nose of the profile is provided not directly or immediately in the area of the inlet cross section (A) of the air inlet. What is advantageous is a distance of the nose to the edge of the inlet cross section (A) of at least 10% of the circumference of the inlet cross section (A). Further advantages are provided by a spacing of at least 25% of the circumference of the inlet cross section (A).

PARTS LIST 1 opening for bleed air
2A top (moveable) element
2B bottom (stationary) element
5 device for the extraction of bleed air
10 axis
20 flow guide element
100 aircraft engine
101 bypass duct
102 wall (fairing)
A inlet cross section
G boundary layer flow
L flowing air
Z bleed air

The invention claimed is:

1. A device for extraction of bleed air from flowing air in an aircraft engine, comprising:
   an adjustable air inlet positioned at or in an area of a wall of the aircraft engine;
   an adjustment mechanism including an actuator for adjusting an inlet cross section of the adjustable air inlet, and
   a flow guide separator for separating and diverting a boundary layer flow away from the adjustable air inlet regardless of a size of the inlet cross section, the flow guide separator including a wedge shaped portion with a rounded nose directed into the boundary layer flow;
   a first element and a second element which are configured to be moveable with respect to one another, so that the first element and the second element form the inlet cross section in a first position, and the first element and the second element close or substantially close the inlet cross section in a second position;
   wherein the first element is moveable;
   wherein the second element is fixed and positioned adjacent the flow guide separator;
   wherein both the first element and the second element are positioned directly radially outwardly from the flow guide separator in a direction away from the wall into the flowing air and transverse to a direction of the flowing air such that all of the first element, the second element and the flow guide separator intersect a same radial plane that is normal to a main axis of the aircraft engine.

2. The device according to claim 1, wherein the flow guide separator is arranged at a transition area of the adjustable air inlet to the wall.

3. The device according to claim 1, and further comprising a bent section which protrudes into the flowing air, wherein the inlet cross section is arranged at an end of the bent section that faces towards the flowing air.

4. The device according to claim 1, wherein in the second position the inlet cross section is closed or oriented such that no bleed air or substantially no bleed air enters through the adjustable air inlet.

5. The device according to claim 1, wherein the first element has a groove-shaped cross section, wherein the second element is arranged in the groove-shaped cross section with a rigid plate or rigid shell, so that the inlet cross section is formed between the first element and the second element.

6. The device according to claim 1, wherein the actuator includes at least one chosen from an electric actuator, a hydraulic actuator and a pneumatic actuator.

7. The device according to claim 1, wherein the nose is arranged away from an immediate area of the inlet cross section, and there is a distance of the nose to an edge of the inlet cross section of at least 10% of a maximum perimeter of the inlet cross section.

8. An aircraft engine including the device according to claim 1.

9. The device according to claim 1, wherein the nose is arranged away from an immediate area of the inlet cross section, and there is a distance of the nose to an edge of the inlet cross section of at least 25% of a maximum perimeter of the inlet cross-section.

\* \* \* \* \*